United States Patent [19]
Terada

[11] 4,364,653
[45] Dec. 21, 1982

[54] FILM SUCTION MECHANISM FOR A CAMERA

[75] Inventor: Katumi Terada, Hachioji, Japan

[73] Assignee: Olympus Optical Company Ltd., Japan

[21] Appl. No.: 300,203

[22] Filed: Sep. 8, 1981

[30] Foreign Application Priority Data

Nov. 8, 1980 [JP] Japan .......................... 55-160203[U]

[51] Int. Cl.³ .............................................. G03B 1/52
[52] U.S. Cl. .................................................. 354/203
[58] Field of Search ....................... 354/203; 352/222; 355/73

[56] References Cited
U.S. PATENT DOCUMENTS 3,528,356  9/1970  Eagle .............................. 354/203 X

FOREIGN PATENT DOCUMENTS 53-159325  12/1978  Japan .................................. 354/203

Primary Examiner—John Gonzales
Attorney, Agent, or Firm—Ostrolenk, Faber, Gerb & Soffen

[57] ABSTRACT

A film suction mechanism for camera comprises a suction unit disposed within a camera body and connected to a suction path having an end opening formed in the camera body, and film suction openings or grooves formed in a rear lid of the camera and connected to a suction path having an end opening formed in the rear lid. The both end openings are connected together to complete the suction path in response to the closure of the rear lid.

13 Claims, 8 Drawing Figures

FILM SUCTION MECHANISM FOR A CAMERA

BACKGROUND OF THE INVENTION

The present invention relates to a film suction mechanism for a camera, and more particularly, to a film suction mechanism for a camera in which a film is held against a pressure plate to maintain it in good planarity.

A film suction mechanism is already known in which a film is held against a pressure plate at the same time as a shutter release operation or in conjunction with a shutter release operation of a camera so that a good planarity of the film can be maintained. As disclosed in Japanese Laid-Open Utility Model No. 159,325/1978, for example, a conventional film suction mechanism is separate from the camera, and is synchronized with a shutter release operation of the camera through an operating member in the form of a release cable. Such film suction mechanism suffers from the following disadvantages:

1. The suction mechanism which is separate from the camera results in a complex construction and an increased size, causing an increased manufacturing cost.
2. Because the suction mechanism is arranged to project rearwardly of a rear lid, the resulting protruding arrangement makes it inconvenient to carry the camera and to contain it in a camera casing.
3. Since the suction applied during a previous shutter release still remains effective on a film during the initial phase of a film winding operation, there results an increased film loading to cause a rubbing action between the film and pressure plate, whereby the film is susceptible to damage.

SUMMARY OF THE INVENTION

It is an object of the present invention to eliminate above disadvantages of the prior art by providing a film suction mechanism for a camera in which a suction unit is disposed within the camera, and is arranged to be connected to film suction openings or grooves formed in a film pressure plate which is disposed on a rear lid, upon closure of the rear lid, thereby completing a suction path.

Advantages achieved with the present invention are:

1. since the suction unit is disposed within the camera and is arranged to be connected to film suction openings or grooves formed in the pressure plate only when the rear lid is closed, the structure is simple and compact, contributing to a reduction in the manufacturing cost;
2. the film suction mechanism is entirely assembled within the camera and has no parts or members which project externally of the camera, thus substantially improving the portable use, containment and ease of operation; and
3. the suction unit may comprise an air damper assembly which is used in a single lens reflex camera to absorb shocks which may be applied to a movable reflecting mirror. This avoids the need for the provision of a separate suction unit. In addition, the compressed air which is produced as the mirror moves down forces the film away from the pressure plate, avoiding any increased loading during the winding of an exposed film and the resulting vulnerability of the film.

DESCRIPTION OF PREFERRED EMBODIMENT

Figure 1:
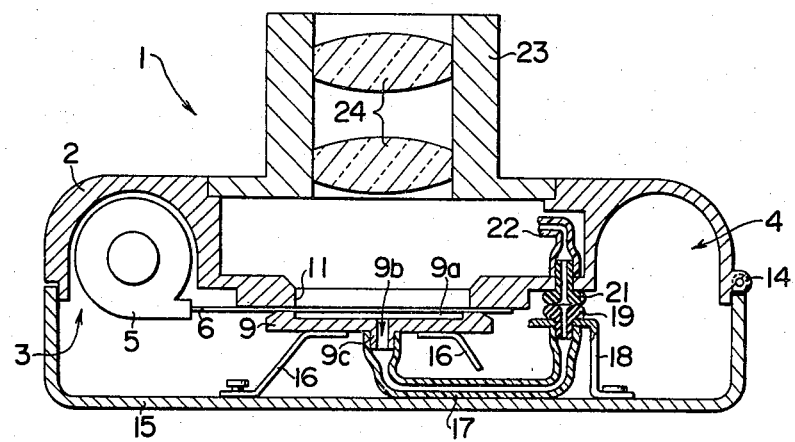
FIG. 1 is a cross section of a photographic camera incorporating the film suction mechanism according to one embodiment of the invention.

Referring to FIG. 1, there is shown a photographic camera incorporating a film suction mechanism according to one embodiment of the invention. In particular, a specific form of suction path is illustrated. Camera 1 shown represents a single lens reflex camera and includes a body 2, in the left-hand end of which is formed a film magazine chamber 3 while a film take-up spool chamber 4 is formed in the right-hand end of the body 2. A film magazine 5 may be loaded into the chamber 3, and film 6 may be taken out of the magazine 5 to be passed along a pair of film guide rails 7 (see FIG. 2), a pair of film position controlling ribs 8 (see FIG. 2), and a film pressure plate 9 so as to be maintained in taut condition along the rear side of a window 11 which defines an image field. Subsequently, the film is fed by a sprocket wheel 12 (see FIG. 2) disposed within the chamber 4 to be taken up on a take-up spool 13 (see FIG. 2). It will be noted that a hinge 14 pivotally mounts a rear lid 15 on the rear side of the body 2.

Figure 3:
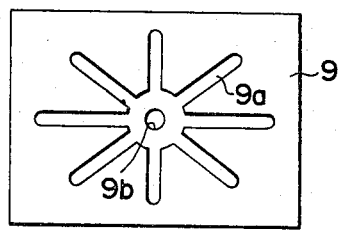
FIG. 3 is a front view of a film pressure plate used in the film suction mechanism of FIG. 1.

The film pressure plate 9 is mounted centrally on the inner surface of the rear lid 15 by means of leaf springs 16 so that the pressure plate 9 is capable of applying a suitable pressure to the film 6. As shown in FIG. 3, a plurality of radially extending film suction grooves 9a are formed in the front side or front surface of the pressure plate 9 which is located opposite to the film 6, the inner end of the grooves 9a communicating with a suction hole 9b which is centrally disposed to extend through the pressure plate to the rear side thereof for connection with a fitting 9c (see FIG. 1). As shown in FIG. 1, a suction tube 17, which defines a suction path for the film 6, has its one end fitted over the fitting 9c, and has its other end fitted over the rear end of a connection member 19 which is mounted on the inner surface of the rear lid 15 by means of a support member 18 and which defines an end opening for the suction path. The connection member 19 is in the form of a short sleeve formed of an elastic material such as rubber, and has an increased thickness in its region which is located forwardly of the support member.

A connection member 21 which is constructed in the similar manner to the connection member 19 is disposed on the body 2 so as to be located opposite to the connection member 19. Both connection members 19, 21 are adapted to bear against each other under a suitable pressure to provide a communication therebetween whenever the rear lid 15 is closed. Another suction tube 22 has its one end fitted over the inner end of the connection member 21 and has its other end connected to an air damper assembly 25 (see FIG. 4) which operates as a suction unit, as will be further described later. It will be seen that the suction tube 22 defines a suction path and the connection member 21 forms an end opening for the suction path. In FIG. 1, numeral 23 represents a lens barrel which receives a taking lens 24 therein.

Figure 4:
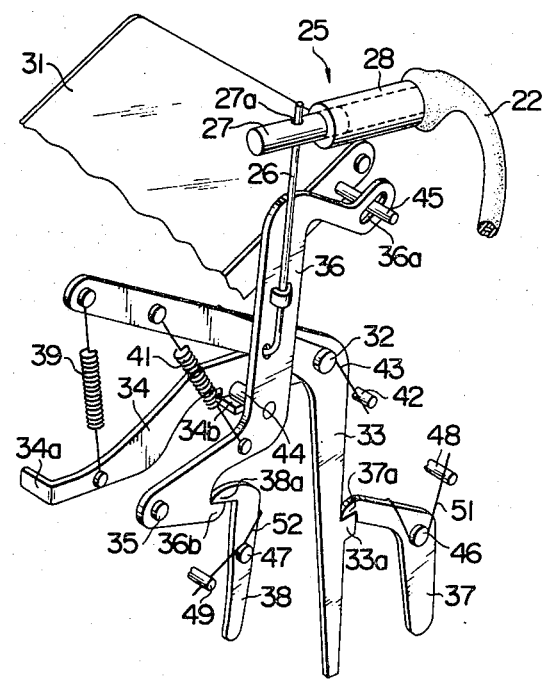
FIG. 4 is a perspective view of an air damper assembly which may be used as a suction unit in the film suction mechanism of FIG. 1.

The air damper assembly 25 is associated with a drive mechanism for a movable reflecting mirror 31 of the single lens reflex camera 1, as shown in FIG. 4. The drive mechanism is already known in itself, and includes a charging lever 33 which is pivotally mounted on a pin 32 which is in turn fixedly mounted on one sidewall, not shown, of a mirror box defined in the body 2, a diaphragm drive arm 34 also pivotally mounted on the pin 32, a mirror drive lever 36 pivotally mounted on a pin 35 which is also fixedly mounted on the sidewall, a return lever 37 for locking the charging lever 33 at its charged position, a release lever 38 for locking the mirror drive lever 36, a diaphragm drive spring 39, formed by a coiled tension spring and extending across one arm of the charging lever 33 and the diaphragm drive lever 34, a mirror drive spring 41, again formed by a coiled tension spring and extending across one arm of the charging lever 33 and the mirror drive lever 36, and a return spring 43 disposed on the pin 32 and having its one end engaged with a stop pin 42 which is fixedly mounted on the sidewall and its other end engaged with one arm of the charging lever 33, the return spring being formed by a torsion spring which tends to have its limbs urged toward each other.

The free end of the diaphragm drive arm 34 is bent at right angles to form a drive piece 34a which operates on a diaphragm mechanism, not shown, disposed within the lens barrel 23. Intermediate its length, the diaphragm drive arm 34 is provided with an abutment piece 34b which is cut and raised therefrom, for receiving a control pin 44 fixedly mounted on the mirror drive lever 36 intermediate its length. The free end of the mirror drive lever 36 is formed with an elongate slot 36a, into which is fitted the free end of a drive pin 45 mounted on the movable reflecting mirror 31. Toward its opposite end, the lever 36 is formed with a hook 36b which extends to the right, as viewed in FIG. 4, for engagement with a hook end 38a formed on the release lever 38.

The charging lever 33 is in the form of a strip having an inverted L-shaped configuration, and its vertically extending arm is formed with a tab 33a intermediate its length, which is adapted to engage a hook 37a formed on one end of the return lever 37. The return lever 37 and the release lever 38 are pivotally mounted on pins 46, 47, respectively, which are fixedly mounted on the sidewall. They are urged to rotate counter-clockwise by torsion springs 51, 52, disposed on the pins 46, 47, respectively, and having their one end engaged with stop pins 48, 49 and other end engaged with one arm of these levers.

The air damper assembly 25 comprises a connecting rod 26 formed of resilient wire which is integrally connected to the mirror drive lever 36, a cylindrical piston member 27 having a through-opening 27a into which the free end of the connecting rod 26 is fitted, and a cylinder member 28 which receives opposite or rear end of the piston member 27 in a hermetic manner. As the mirror drive lever 36 drives the movable reflecting mirror 31 upward, the angular movement of the lever 36 is transmitted through the connecting rod 26 to move the piston member 27 forwardly or in a direction out of the cylinder member 28. Conversely, when the mirror 31 moves down, the piston member 27 is driven inward into the cylinder member 28. In this manner, the compression and expansion of air within the cylinder is effective to alleviate any shocks which the mirror 31 may otherwise experience at the termination of their upward or downward movement. It will be noted that the suction tube 22 has its one end fitted over the rear end of the cylinder member 28. In this manner, in addition to functioning as a shock absorber associated with mirror 31, the air damper assembly 25 also functions as a suction unit to cause the film 6 to be attracted against the pressure plate 9 as the mirror 31 is driven upward.

Figure 2:
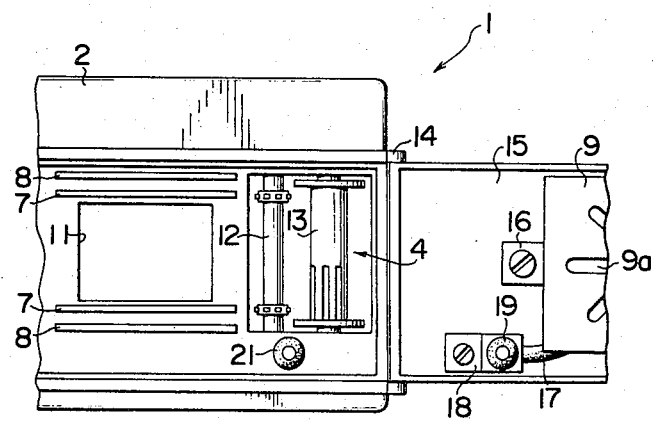
FIG. 2 is a fragmentary rear view of the camera shown in FIG. 1, with the rear lid maintained open.

In operation, under the condition shown in FIG. 2 where the rear lid 15 is opened, the film magazine 5 is loaded into the magazine chamber 3, and the leader of the film 6 is pulled out of the magazine 5, extended along the window 11 defining an image field in taut condition and finally wrapped around the take-up spool 13 located within the take-up spool chamber 4. The rear lid may now be closed, whereupon the film 6 is urged by the pressure plate 9 to extend therealong, as shown in FIG. 1. At the same time, the connection member 19 on the part of the rear lid 15 moves into abutment against the connection member 21 on the part of the camera body, whereby the suction tubes 17, 12 connected with these members communicate with each other in a hermetic manner. In other words, a suction path which couples the suction grooves 9a in the pressure plate 9 and the air damper assembly 25 is completed.

Subsequently, under the charged condition of the drive mechanism associated with the movable reflecting mirror 31 as shown in FIG. 4, the depression of a shutter release button, not shown, of the camera causes the release lever 38 to move clockwise about the pin 47 against the resilience of the spring 52, whereby the hook 36b is disengaged from the hook end 38a. This releases the mirror drive lever 36, which therefore moves counter-clockwise about the pin 35 under the resilience of the spring 41, allowing the cooperation between the slot 36a and drive pin 45 to move the movable reflecting mirror 31 upward or out of the taking light path. Simultaneously, the rotation of the mirror drive lever 36 causes the control pin 44 to move, whereby the abutment piece 34b follows the movement of the control pin 44 under the resilience of the spring 39, causing the diaphragm drive arm 34 to move clockwise about the pin 32, thus allowing the drive piece 34a to control the diaphragm aperture in the closing direction.

On the other hand, as the mirror 31 is driven upward, the rotation of the mirror drive lever 36 causes the connecting rod 26 which is integrally connected therewith to move counter-clockwise about the pin 35, thus causing the piston member 27 to be pulled forwardly, producing a reduced pressure within the cylinder member 28. As a result, the air is withdrawn from the suction grooves 9a formed in the pressure plate 9 through the suction path including the suction tube 22, the connection members 21, 19 and the suction tube 17. As a result, the film 6 which is placed over the pressure plate 9 is subject to suction applied through the grooves 9a to lie flat against the front surface of the pressure plate 9, thus achieving a good planarity in the film 6.

After the reflecting mirror 31 has been driven up and the diaphragm aperture has been controlled, the completion of rotation of the mirror drive lever 36 allows the first blind of a focal plane shutter, not shown, to run, initiating an exposure of the film surface. Upon completion of the exposure of the film surface, the second shutter blind, not shown, is allowed to run. From the initiation of running of the first blind to the completion of running of the second blind, or during the exposure of the film surface, the film 6 is held attracted against the pressure plate 9 to maintain a good planarity, thus assuring an exposure of a high accuracy.

When the running of the second shutter blind is completed, the return lever 37 is driven clockwise about the pin 46 against the resilience of the spring 51, thus disengaging the hook 37a from the tab 33a. Thereupon the charging lever 33 is allowed to move counter-clockwise about the pin 32 under the resilience of the return spring 43, forcing the control pin 44 down to return the mirror drive lever 36. In this manner, the reflecting mirror 31 moves down to a position which is inclined at an angle of 45° with respect to the taking light path and where it defines a finder light path. As the mirror drive lever 36 returns, the control pin 44 forces the abutment piece 34b down, whereby the diaphragm drive arm 34 also returns, reestablishing a fully open diaphragm aperture.

On the other hand, as the mirror 31 moves down, the rotation of the mirror drive lever 36 causes the connecting rod 26, integrally connected therewith, to move clockwise about the pin 35. As a result, the piston member 27 is driven rearward, producing an increased pressure within the cylinder member 28 to cause an air injection from the suction grooves 9a formed in the pressure plate 9 through the path including the suction tube 22, the connection members 21, 19 and the suction member 17. Consequently, the film 6 which has been held flat against the front surface of the pressure plate 9 during the exposure is driven away therefrom. Consequently, when the exposed film 6 is wound up, it can be fed toward the take-up spool 13 very smoothly, avoiding any increased loading on the film winding assembly or any damage caused to the film 6.

To complete the description, a film winding operation also accompanies a shutter charging operation, which allows the charging lever 33 to move clockwise, thus charging the springs 39, 41 and 43. The charging lever 33 is locked at its charged position by the return lever 37. The drive mechanism associated with the movable reflecting lever 31 then returns to the charged condition shown in FIG. 4.

Figure 5:
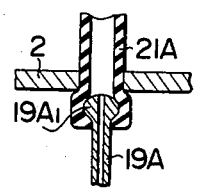
FIGS. 5 and 6 are fragmentary cross sections, illustrating other forms of connection members which are used in the film suction mechanism of FIG. 1.
Figure 6:
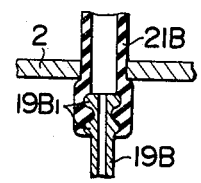

FIGS. 5 and 6 illustrate other forms of connection members which define the end openings of the suction path. In the embodiment shown in FIG. 1, the both connection members 19, 21 are formed by tubes of an elastic material and the both members are brought into abutment against each other as the rear lid 15 is closed, thus completing the suction path. In the arrangement of FIG. 5, a connection member 19A provided on the rear lid 15 is formed by a tube having a spherical end 19A1, which is forcibly fitted into a connection member 21A, formed by an elastic hollow cylinder, which is provided on the part of the camera, in response to the closure of the lid 15, thus achieving a connection between the both members 19A, 21A. In the arrangement of FIG. 6, a connection member 19B provided on the rear lid 15 is formed by a tube having a double flange end 19B1, which is again forcibly fitted into a connection member 21B, provided on the camera body 2 and which is formed by a hollow elastic cylinder, in response to the closure of the lid 15, thus achieving a connection between the both members 19B, 21B. It should be understood that the suction path defined within the camera body 2 and the suction path defined on the part of the rear lid 15 can be hermetically connected together by using the connection means illustrated in FIG. 5 or 6 in the same manner as in the embodiment of FIG. 1.

Figure 7:
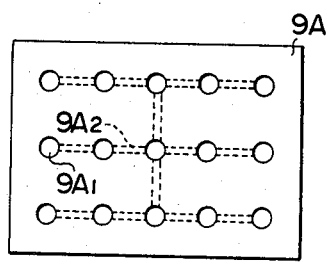
FIGS. 7 and 8 are front views of other forms of film pressure plate which may be used in place of the pressure plate shown in FIG. 3.
Figure 8:
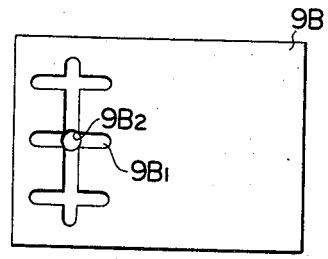

FIGS. 7 and 8 show other forms of a film pressure plate. FIG. 7 shows a pressure plate 9A in which, instead of providing radially extending suction grooves 9a as shown in FIG. 3, a plurality of suction holes 9A, 9A1 are formed in the front surface of the pressure plate 9A and are disposed in a matrix form and which are connected together by communication openings 9A2. The suction holes 9A1 are located in alignment with specific locations on the film 6 where the planarity is normally poor, for example, along the upper and lower lateral edges or the central portion of the film. In this manner, the planarity of the film 6 can be further improved by using the pressure plate 9A.

FIG. 8 shows a film pressure plate 9B which is designed to prevent a curling effect of the film effectively. As is well recognized, the resiliency of the film 6 itself cause part of the film disposed within the image field toward the take-up spool 13 or the magazine 5 to lift up in a camera in which the film 6 is wound in the opposite direction on the take-up spool 13 or in a small camera having a reduced spacing between the location of the magazine 5 and the window 11 which defines the image field. Specifically, formed in the front surface of the pressure plate 9B, adjacent to its end located toward either the spool 13 or the magazine 5, are a succession of cruciform suction grooves 9B1, which communicate with a suction hole 9B2 for connection with a fitting, not shown, which is disposed on the rear side of the pressure plate. With this pressure plate 9B, the suction can be applied in a concentrated manner to those areas of the film 6 which exhibit a poor planarity, thus permitting an effective correction of the planarity.

In the embodiment described above, the suction unit comprises an air damper assembly associated with a mirror drive mechanism for a single lens reflex camera, but it should be understood that any other suction means may be provided separately.

What is claimed is:

1. A film suction mechanism for a camera, comprising a suction unit disposed with a camera body, a first suction path communicating with said suction unit and formed in said camera body, a film pressure plate mounted on a rear lid of said camera body and having film suction openings formed therein, and a second suction path formed in said rear lid and communicating with said film suction openings, said second suction path being arranged so that it is connected to said first suction path in response to closure of said rear lid, thereby establishing a fluid communication between the suction unit and said film suction openings.

2. A film suction mechanism according to claim 1 in which said camera further includes a movable reflecting mirror and said suction unit comprises an air damper assembly which operates as a shock absorber associated with an upward and a downward movement of said movable reflecting mirror.

3. A film suction mechanism according to claim 1 in which both said suction paths comprise connection members in the form of hollow resilient cylinders and are adapted to communicate with each other hermetically as their end faces are brought into abutment against each other.

4. A film suction mechanism according to claim 1 in which said first suction path comprises a first connection member in the form of a hollow resilient cylinder and said second suction path comprises a second connection member in the form of a tube having a spherical end, said spherical end fitting into said hollow resilient cylinder when said rear lid is closed.

5. A film suction mechanism according to claim 1 in which said first suction path comprises a first connection member in the form of a hollow resilient cylinder and said second suction path comprises a second connection member in the form of a tube having a double flange adjacent to its free end, said double flange fitting into said hollow resilient cylinder when said rear lid is closed.

6. A film suction mechanism according to claim 1 in which said film suction openings are formed in the front surface of the film pressure plate and are distributed in a matrix form.

7. A film suction mechanism according to claim 1 in which said film suction openings are formed in the front surface of said pressure plate and take the form of grooves extending radially from a common center.

8. A film suction mechanism according to claim 1 in which said film suction openings are formed in said front surface of the pressure plate toward its lateral edge which is adjacent to either a film take-up spool chamber or a film magazine chamber.

9. A film suction mechanism for a camera body, comprising:
 a camera body having a rear lid movable between an open and a closed position;
 a film pressure plate mounted on said rear lid and having film suction openings formed therein;
 a suction unit disposed within said camera body;
 means defining a suction path between said suction unit and said film suction openings, said means being so structured that it defines a closed suction path between said suction unit and said film suction openings when said lid is in said closed position and an open suction path between said suction unit and said film suction openings when said lid is in said open position.

10. A film suction mechanism according to claim 9, wherein said means includes:
 a first suction path associated with said suction unit;
 a second suction path associated with said pressure plate; and
 means for fluidly connecting said first and second suction paths when said rear lid is closed.

11. A film suction mechanism according to claim 9, wherein said means comprises:
 a first hollow resilient cylinder having first and second ends, said first end being coupled to said suction unit; and
 a second hollow cylinder having first and second ends, said first end of said second hollow cylinder being coupled to said film suction openings;
 the position of said first and second hollow cylinders being such that their second ends are brought into abutment against each other so as to form a closed suction path between said suction unit and said film suction openings when said lid is closed.

12. A film suction mechanism according to claim 11, wherein said second end of said second cylinder has a spherical projection which is inserted into said second end of said first cylinder when said rear lid is closed.

13. A film suction mechanism according to claim 11, wherein said second end of said second cylinder has a double flange which extends into said second end of said first cylinder when said rear lid is closed.

* * * * *